(12) United States Patent
Royer et al.

(10) Patent No.: US 12,152,816 B1
(45) Date of Patent: Nov. 26, 2024

(54) APPARATUS AND METHOD OF LIQUEFIED GAS ELECTROLYTE PREPARATION

(71) Applicant: SOUTH 8 TECHNOLOGIES, INC., San Diego, CA (US)

(72) Inventors: James Royer, San Diego, CA (US); Cyrus S. Rustomji, San Diego, CA (US); Jungwoo Lee, San Diego, CA (US); Elena Machado, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/653,670

(22) Filed: May 2, 2024

(51) Int. Cl.
*F25B 39/04* (2006.01)
*H01M 10/0569* (2010.01)
*H01M 10/0567* (2010.01)
*H01M 10/0568* (2010.01)

(52) U.S. Cl.
CPC ......... *F25B 39/04* (2013.01); *H01M 10/0569* (2013.01); *H01M 10/0567* (2013.01); *H01M 10/0568* (2013.01); *H01M 2300/0028* (2013.01)

(58) Field of Classification Search
CPC ............... F25B 39/04; H01M 10/0569; H01M 10/0567; H01M 10/0568; H01M 2300/0028
See application file for complete search history.

(56) References Cited

U.S. PATENT DOCUMENTS

| | | | |
|---|---|---|---|
| 2004/0099522 A1 | 5/2004 | Neubert | |
| 2016/0261005 A1 | 9/2016 | Rustomji et al. | |
| 2020/0203703 A1* | 6/2020 | Royer | H01M 10/63 |
| 2021/0041165 A1 | 2/2021 | Williams | |
| 2021/0313611 A1* | 10/2021 | Rustomji | H01M 10/052 |

FOREIGN PATENT DOCUMENTS

| | | | | |
|---|---|---|---|---|
| JP | 2000-033232 | | 2/2000 | |
| WO | WO-2024020072 A1 * | 1/2024 | | H01G 9/0029 |

OTHER PUBLICATIONS

International Search Report for PCT/US24/27501 dated Sep. 20, 2024 (13 pages).

* cited by examiner

*Primary Examiner* — Joseph F Trpisovsky
(74) *Attorney, Agent, or Firm* — Manuel de la Cerra

(57) ABSTRACT

A setup for preparing a liquified gas electrolyte (LGE) is disclosed. The setup includes a solvent container that contains a liquified gas solvent, a condensing container with an inlet, an outlet and an electrolyte container. The condensing container may contain a salt. The condensing container also has a heat sink and a heating element to raise and lower its internal temperature. A first valve fluidly connects the solvent container to the inlet, and a second valve fluidly connects the electrolyte container to the outlet. The setup has at least two configurations: a solvent transfer configuration, and a salt transfer configuration.

26 Claims, 12 Drawing Sheets

(Setup 1-7)

(Setup 1-1)

(Solvent Transfer Configuration)

(Salt Transfer Configuration)

(Setup 1-2)

(Setup 1-3)

(Solvent Transfer Configuration)

(Salt Transfer Configuration)

(Setup 1-4)

(Setup 1-5)

(Setup 1-6)

(Setup 1-7)

(Setup 1-8)

APPARATUS AND METHOD OF LIQUEFIED GAS ELECTROLYTE PREPARATION

CROSS-REFERENCE TO RELATED APPLICATIONS

This application is related to the following applications and patents, each of which is hereby incorporated by reference in its entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued Aug. 10, 2021; U.S. Pat. No. 10,873,070 issued on Dec. 22, 2020; U.S. Pat. No. 11,342,615 issued on May 24, 2022; PCT/US20/26086 filed on Apr. 1, 2020; PCT/US22/31594 filed on May 31, 2022; PCT/US23/11864 filed on Jan. 30, 2023; PCT/US23/17720 filed on Apr. 6, 2023; PCT/US23/28104 filed on Jul. 19, 2023; PCT/US23/28105 filed on Jul. 19, 2023; PCT/US23/35766 filed on Oct. 24, 2023; PCT/US24/16784 filed on Feb. 21, 2023; PCT/US24/18746 filed on Mar. 6, 2024; PCT/US24/16784 filed on Feb. 21, 2024; PCT/US24/25771 filed on Apr. 23, 2024; U.S. Application 63/418,703 filed on Oct. 24, 2022; U.S. Application 63/461,252 filed on Apr. 22, 2023; U.S. Application 63/461,387 filed on Apr. 24, 2023; U.S. Application 63/470,174 filed on May 31, 2023; U.S. Application 63/534,213 filed on Aug. 22, 2023; and U.S. Application 63/450,745 filed on Mar. 8, 2023.

FIELD OF THE INVENTION

Embodiments of the invention relate to an apparatus and a method for mixing liquefied gas with a salt for the preparation of electrochemical energy storage devices.

BACKGROUND OF THE INVENTION

Preparation of liquefied gas electrolytes (LGE) requires efficient methods of transferring and mixing solids or liquids with liquefied gases into a single container. Mixing of solid or liquid components with the liquefied gas components may require different methods compared to the methods used for conventional electrolytes. Using the vapor pressure of the liquefied gas components to facilitate transfer of the solid or liquid may enable efficient mixing for LGEs.

Conventional methods for mixing electrolytes may include the direct addition of solvent and salt into an open container. In some examples, the mixing container may have a liquid solvent feed from a liquid solvent bulk container and a solid salt feed from a bulk condensing container. For LGE mixing containers, it may not be desirable to use a salt feed and a liquefied gas feed because the large vapor pressure of the liquefied gas may cause solvent vapor to back stream into the bulk condensing container. This may lead to loss of liquefied gas from the mixing container, and may also lead to inaccurate component masses in LGE formulations.

The prior art has demonstrated that the performance of electrochemical devices is greatly affected by the composition of the electrolyte. Deviations in the composition of electrolyte can negatively impact the performance of electrochemical devices. For instance, inaccurate ratios of one electrolyte component to another may not allow for the full utilization of all the electrode capacity within the device.

A need exists for an apparatus and method that efficiently transfers and mixes solids or liquids with liquefied gases into a single container.

SUMMARY OF THE INVENTION

A setup for preparing a liquified gas electrolyte (LGE) is disclosed. The setup includes a solvent container that contains a liquified gas solvent, a condensing container with an inlet, an outlet, and an electrolyte container. The condensing container may contain a salt. The condensing container also has a heat sink and a heating element to raise and lower its internal temperature. A first valve fluidly connects the electrolyte container to the inlet, and a second valve fluidly connects the electrolyte container to the outlet. The setup has at least two configurations: a solvent transfer configuration, and a salt transfer configuration.

During the solvent transfer configuration, the first valve is opened, the second valve is closed, and the heat sink is activated to lower the internal temperature of the condensing container to below that of the internal temperature of the solvent container, thereby causing the liquified gas solvent to transfer from the solvent container to the condensing container.

During the salt transfer configuration, the first valve is closed, the second valve is opened, and the heating element is activated to raise the internal temperature of the condensing container to a temperature above that of the internal temperature of the electrolyte container, thereby causing the liquified gas solvent and salt to transfer from the condensing container to the electrolyte container and mix therein to form the LGE.

The heat sink may include a refrigeration unit. The heat sink and the heating element may be a single device.

Tubing may fluidly connect the solvent container to the inlet, and a vacuum pump may be connected to the tubing. Prior to the solvent transfer configuration, the vacuum pump may be activated to evacuate contaminants within the tubing. Tubing may also fluidly connect the outlet to the electrolyte container, and a vacuum pump may be connected to the tubing. Prior to the salt transfer configuration, the vacuum pump may be activated to evacuate contaminants within the tubing.

The solvent container and the electrolyte container may be a single solvent/electrolyte combined container.

A buffer container may be fluidly connected to the inlet and to the solvent/electrolyte combined container. The buffer container may include a second heating element. During the solvent transfer configuration, the second heating element may be activated to raise the internal temperature of the buffer container to a temperature above that of the internal temperature of the condensing container.

A pump may be fluidly connected to the inlet and to the solvent/electrolyte combined container or the solvent container, and during the solvent transfer configuration, the pump may be activated, thus pumping the liquified gas solvent into the condensing container. The pump may be fluidly connected to the outlet and to the solvent/electrolyte combined container or to the electrolyte container, and during the salt transfer configuration, the pump may be activated, thus pumping the liquified gas solvent and salt into the solvent/electrolyte combined container or the electrolyte container. The setup may also have two pumps, one connected to the inlet and one connected to the outlet.

A mass flow controller (MFC) may be fluidly connected to the inlet and to the solvent/electrolyte combined container or the solvent container, and during the solvent transfer configuration, the MFC controls the amount of liquified gas solvent transferred into the condensing container.

A processor may control the heat sink, the heating element, the first valve and the second valve. During the solvent transfer configuration, the processor opens the first valve, closes the second valve, and activates the heat sink. During the salt transfer configuration, the processor closes the first valve, opens the second valve, and activates the heating element.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1A:
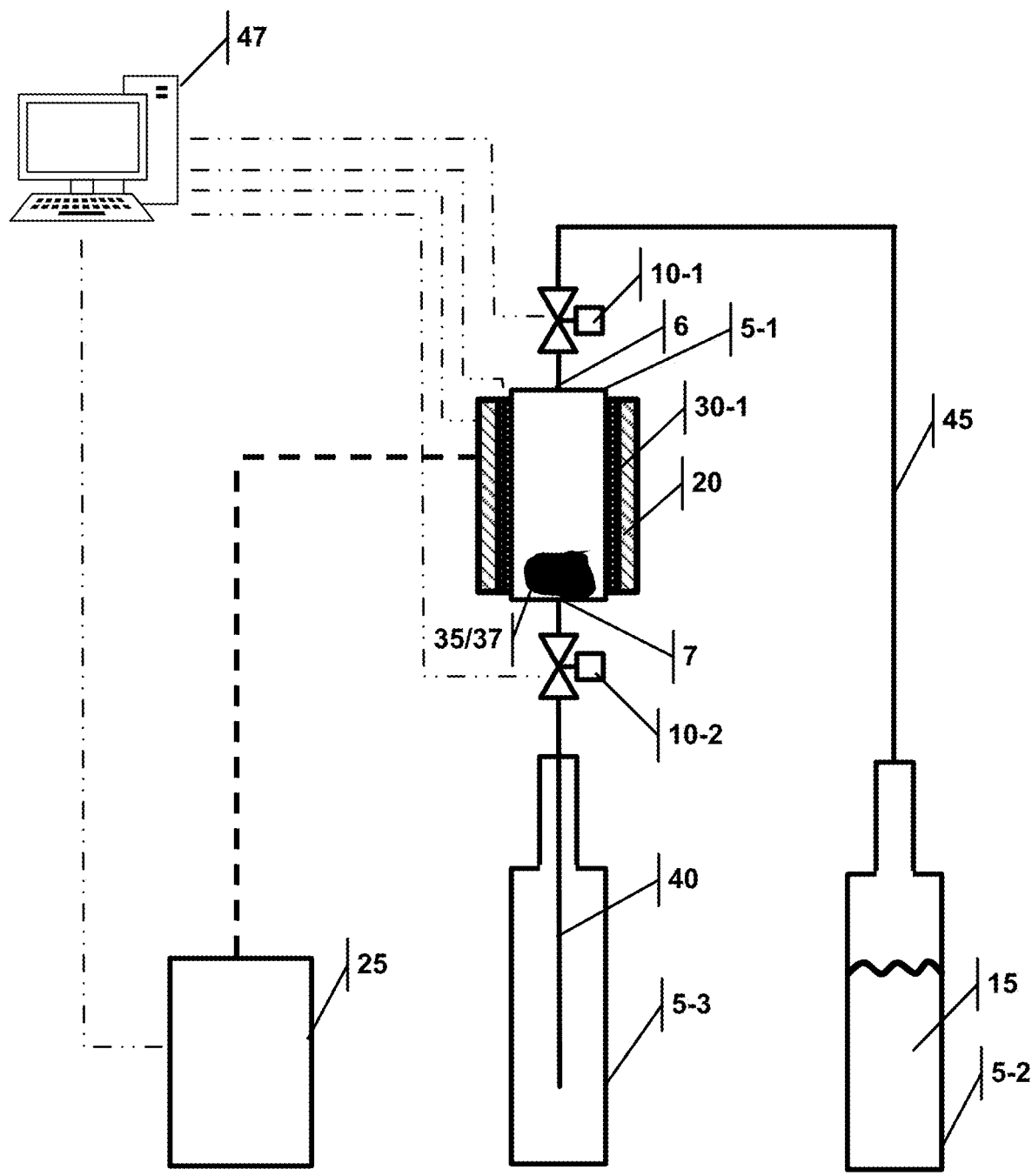
FIG. 1A is a block diagram showing a setup for salt transfer from a condensing container to an electrolyte container using a liquefied gas.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention, as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

Setup 1-1
Setup 1-2
Setup 1-3
Setup 1-4
Setup 1-5
Setup 1-6
Setup 1-7
Setup 1-8
Condensing Container 5-1
Solvent Container 5-2
Electrolyte Container 5-3
Solvent/Electrolyte Combined Container 5-4
Inlet 6
Outlet 7
Valve 10-1
Valve 10-2
Valve 10-3
Valve 10-4
Valve 10-5
Valve 10-6
Valve 10-7
Valve 10-8
Valve 10-9

Liquefied Gas Solvent 15
Liquified Gas Solvent Transfer Path 15-1
Salt and Liquified Gas Solvent Transfer Path 15-2
Heat Sink 20
Refrigeration Unit 25
Heating Element 30-1
Heating Element 30-2
Salt 35
Additive 37
Dip Tube 40
Tubing 45
Processor 47
Vacuum Pump 50
Buffer Container 55
Pump 60-1
Pump 60-2
Mass Flow Controller 65

What follows are eight non-limited examples showing various embodiments of the present invention.

One such embodiment is the setup 1-1 illustrated in FIG. 1A. In the setup 1-1, the liquefied gas solvent 15 is supplied by a liquefied gas solvent source, referred to herein as the solvent container 5-2. The solvent container 5-2 may have a material with a vapor pressure above 100 kPa at a temperature of 293.15 K, such as a liquified gas solvent 15. The solvent container 5-2 is fluidly connected to an inlet 6 on the condensing container 5-1 through valve 10-1. The electrolyte container 5-3 is fluidly connected to an outlet 7 on the condensing container 5-1 through the valve 10-2.

Figure 1B:
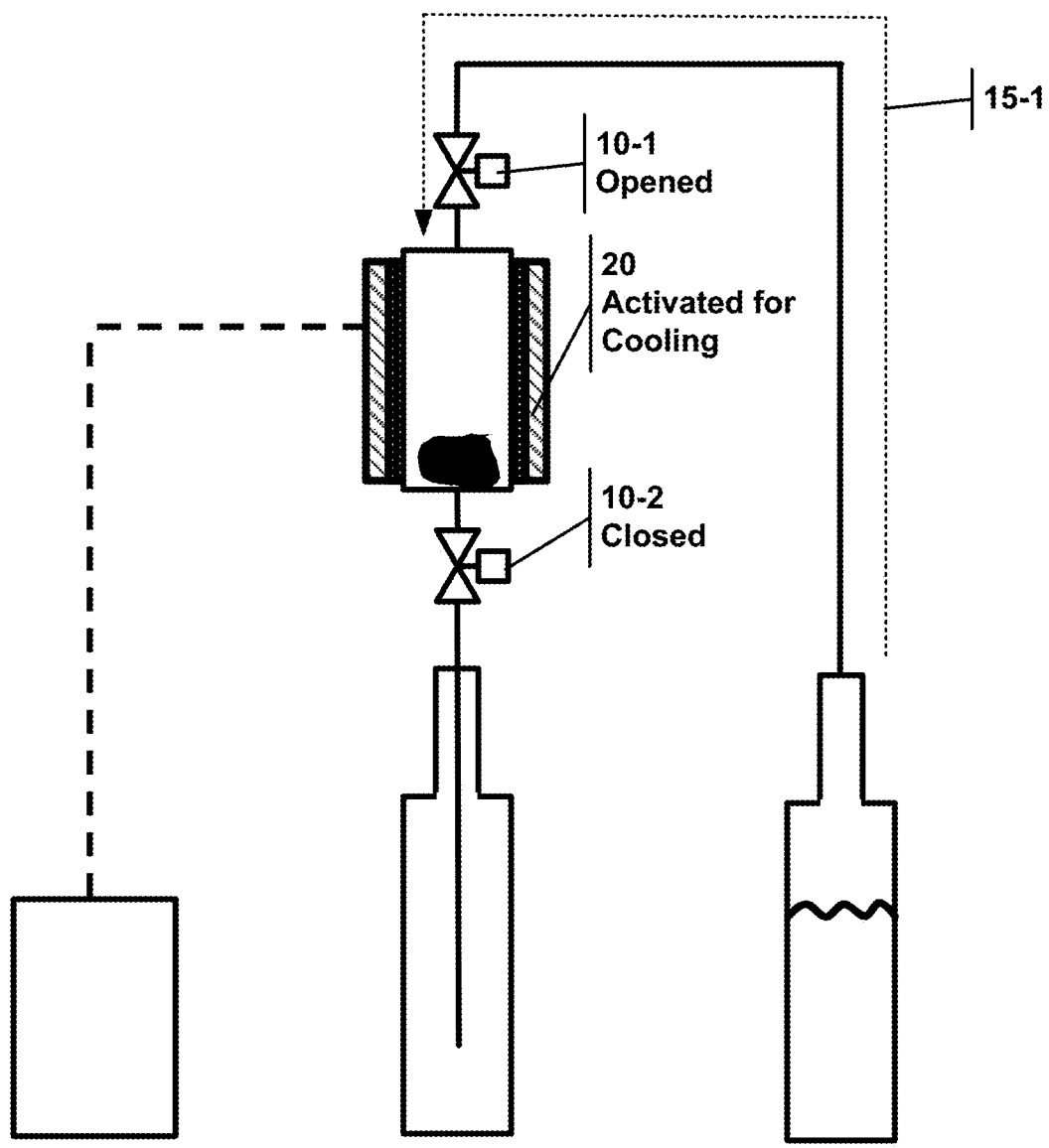
FIG. 1B is the solvent transfer configuration of the setup of FIG. 1A.

In the solvent transfer configuration shown in FIG. 1B, valve 10-1 is opened, valve 10-2 is closed, and the vapor of the liquefied gas solvent 15 is transferred to the condensing container 5-1 (shown by path 15-1). The condensing container 5-1 is connected to a heat sink 20, which in turn is connected to and is regulated by a refrigeration unit 25 to cool the condensing container 5-1 below the temperature of the solvent container 5-2; thus, the vapor of the liquefied gas solvent 15 is condensed within the condensing container 5-1 into a liquefied gas. Maintaining the condensing container 5-1 at a temperature lower than that of the solvent container 5-2 will allow for the condensation of the liquefied gas solvent 15 into the condensing container 5-1. The condensing container 5-1 may be cooled to less than 50 degrees Celsius, preferably to less than 25 degrees Celsius, more preferably to less than 0 degrees Celsius, and even more preferably to less than -20 degrees Celsius. The heat sink 20 may comprise a thermally conductive material in contact with the condensing container 5-1. The heat sink 20 may be, but is not limited to: a solid container, a bed of metal shot, a liquid bath, an ice bath, a dry ice bath, or a gas flow. The refrigeration unit 25 may be, but is not limited to: a circulating chiller, Peltier cooler, or a refrigerated gas.

Figure 1C:
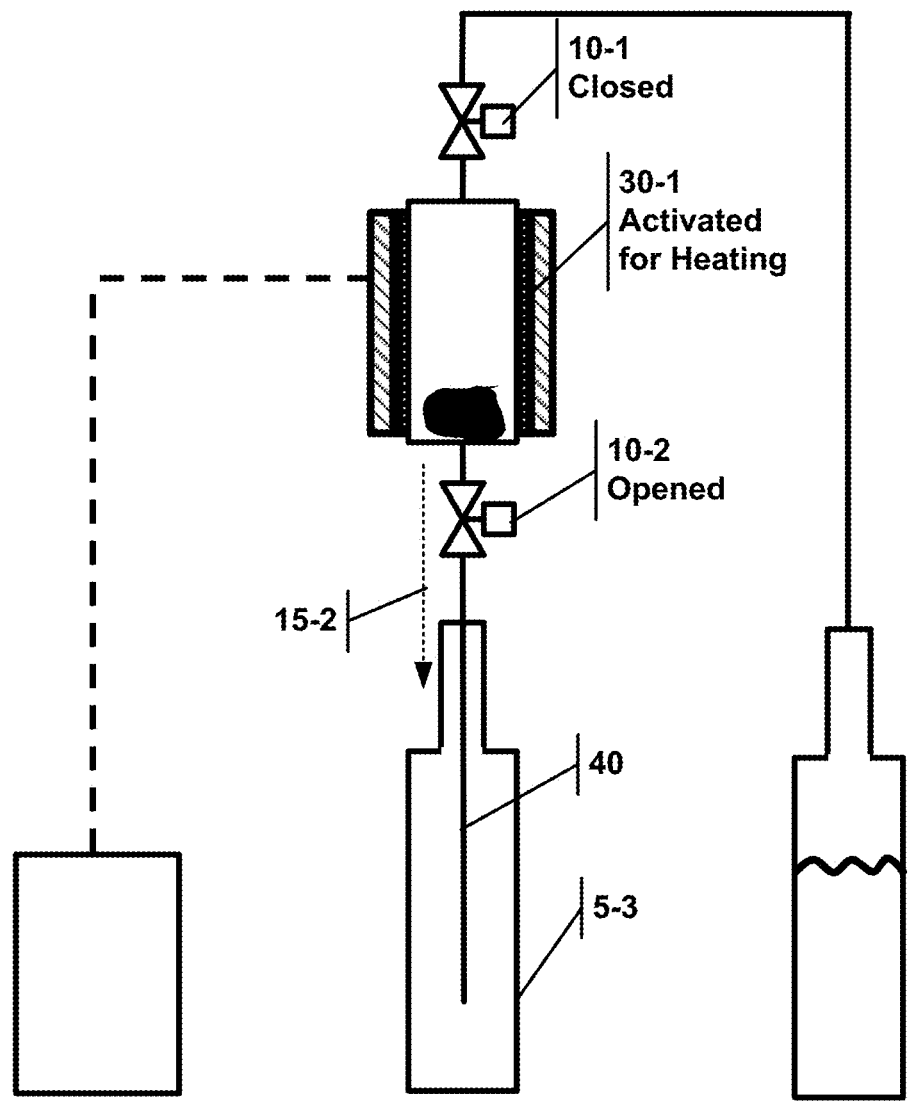
FIG. 1C is the salt transfer configuration of the setup of FIG. 1A.

In the salt transfer configuration shown in FIG. 1C, valve 10-1 is closed, and valve 10-2 is opened. The condensing container 5-1 may have a material with a vapor pressure below 100 kPa at a temperature of 293.15 K, such as a salt 35. The condensing container 5-1 may also have an additive 37. The condensing container 5-1 is connected to a heating element 30-1 to heat the condensing container 5-1 to above the temperature of the electrolyte container 5-3 so that the vapor pressure of the liquefied gas solvent 15 in the condensing container 5-1 exceeds the internal pressure of the electrolyte container 5-3. The condensing container 5-1 may be heated to more than -20 degrees Celsius, preferably to more than 0 degrees Celsius, more preferably to more than 25 degrees Celsius, and even more preferably to more than 40 degrees Celsius. In some embodiments the heat sink 20 and the heating element 30-1 may be a single device, such as a refrigerated recirculating chiller with an integrated heating element. Because the valve 10-2 is opened, the salt 35 and the liquefied gas solvent 15 may be transferred from the condensing container 5-1 to the electrolyte container 5-3 by means of the pressure differential between them (as shown by path 15-2). The salt 35 may be insoluble, partially soluble, or fully soluble in the liquefied gas solvent 15; therefore, the salt 35 may be transferred to the electrolyte container 5-3 as a component of a solution, or as a solid suspension.

The salt 35 in the condensing container 5-1 may not be entirely transferred to the electrolyte container 5-3 along with the liquefied gas solvent 15; thus, it may be necessary to repeat both the solvent transfer configuration step and the salt transfer configuration step multiple times until all the liquefied gas solvent 15 from the solvent container 5-2 and all the salt 35 from the condensing container 5-1 have been removed and transferred into the electrolyte container 5-3. This may be the case when the internal volume of the condensing container 5-1 is sized to accommodate only a portion of the liquefied gas solvent 15 in the solvent container 5-2 in addition to the salt 35 or additive components 37. The salt 35 and the liquefied gas solvent 15 may mix in the electrolyte container 5-3 (and/or partially in the condensing container 5-1) to form a liquified gas electrolyte (LGE).

The electrolyte container 5-3 may have a dip tube 40 constructed from metal, plastic, or ceramic tubing or piping of variable size. In some embodiments, the dip tube 40 may be, but is not limited to: ¹⁄₁₆-inch, ⅛-inch, ¼-inch, ½-inch, 1-inch, or 2-inch outer diameter. The dip tube 40 may be used for dispensing the liquefied gas electrolyte after is has been fully mixed in the electrolyte container 5-3.

Preferably, the valves (10-1, 10-2), the heating element 30-1, the heat sink 20 and refrigeration unit 25 are connected to and are controlled by processor 47. This would automate the solvent transfer configuration (FIG. 1B) and the salt transfer configuration (FIG. 1C).

Figure 2:
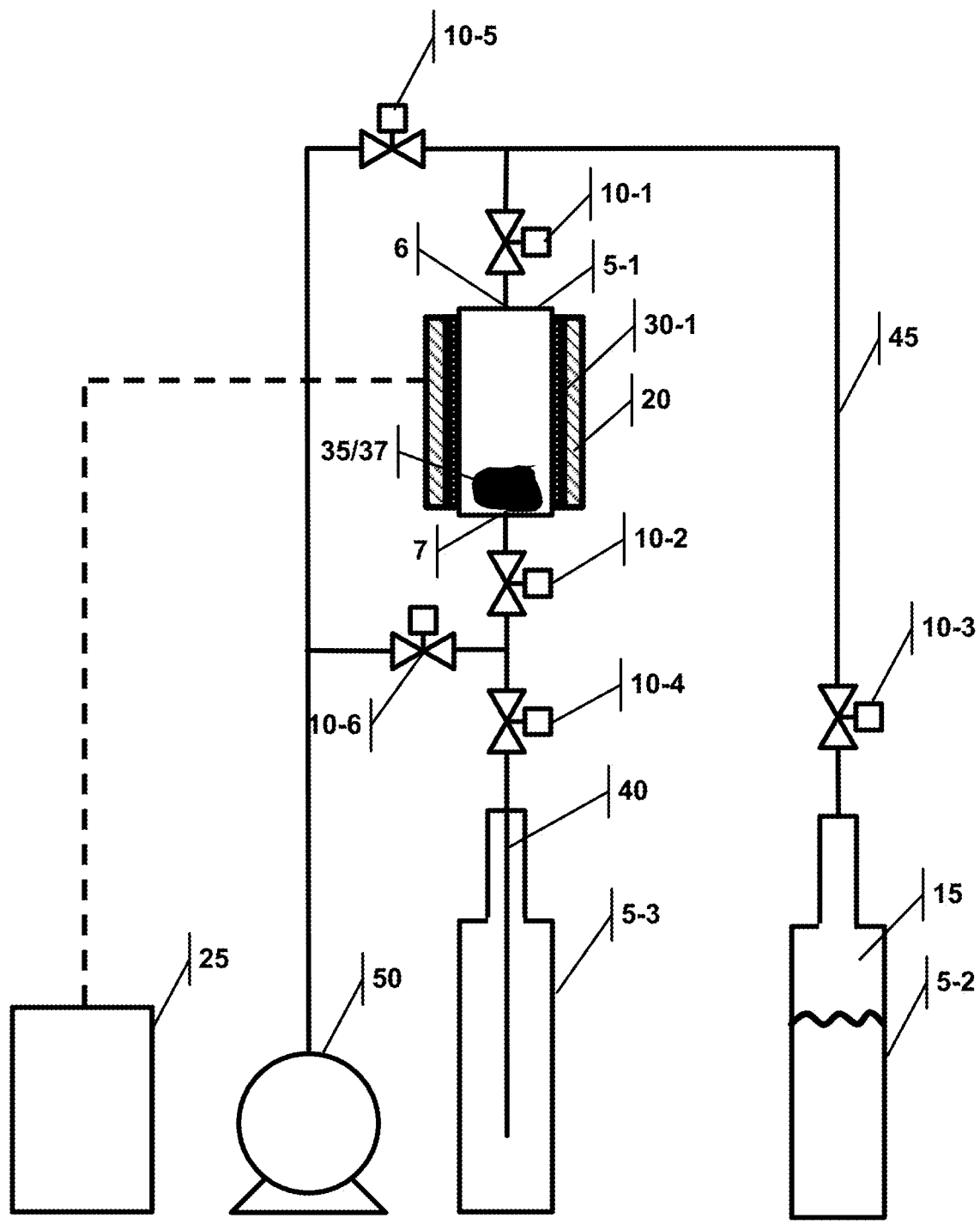
FIG. 2 is a block diagram showing a setup for salt transfer from a condensing container to an electrolyte container using a liquefied gas, which further includes a vacuum pump.
Figure 3A:
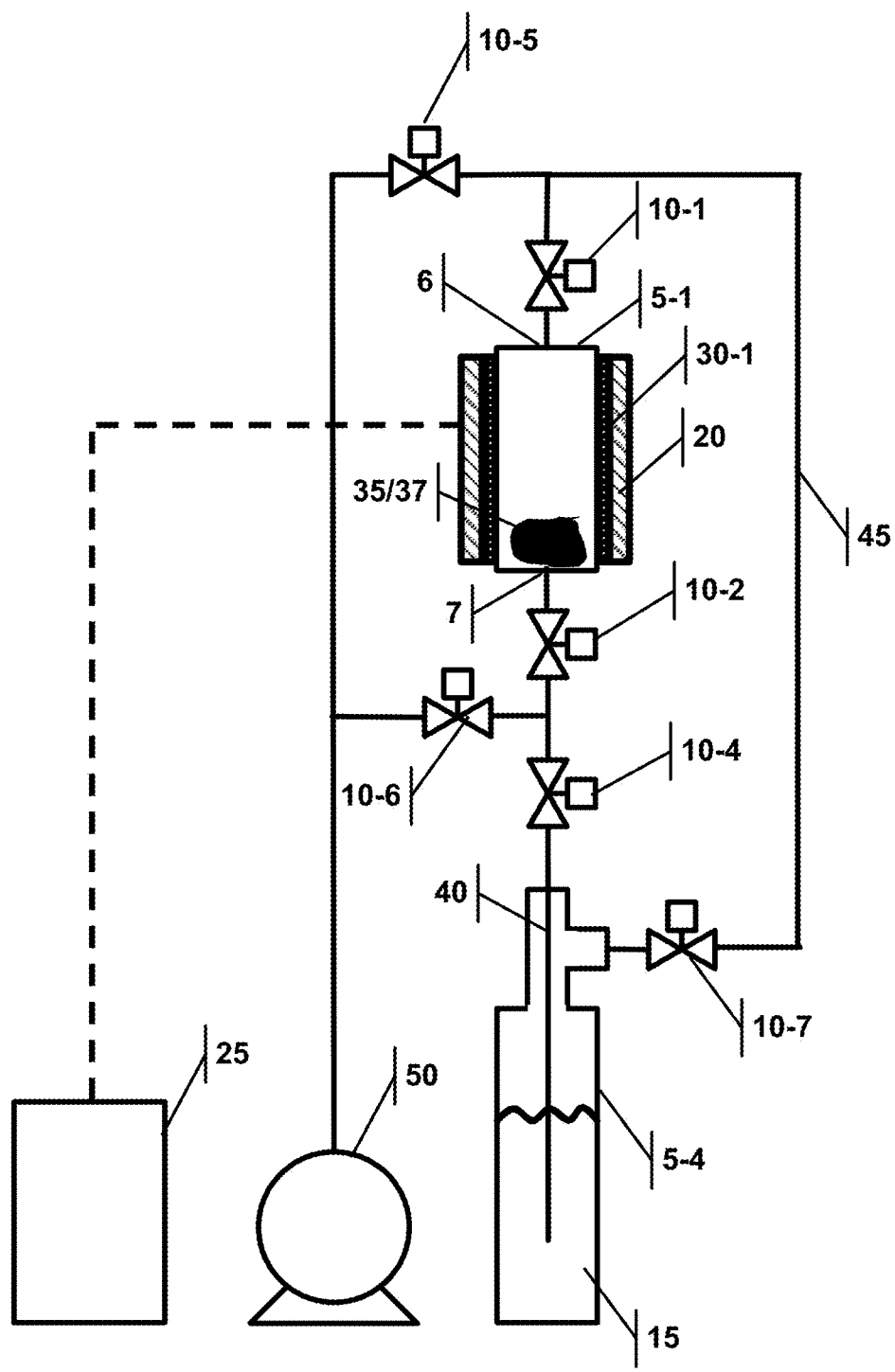
FIG. 3A is a block diagram showing a setup of the apparatus for salt transfer from a condensing container to an electrolyte container using a liquefied gas, where the electrolyte container is pre-loaded with liquefied gas.
Figure 3B:
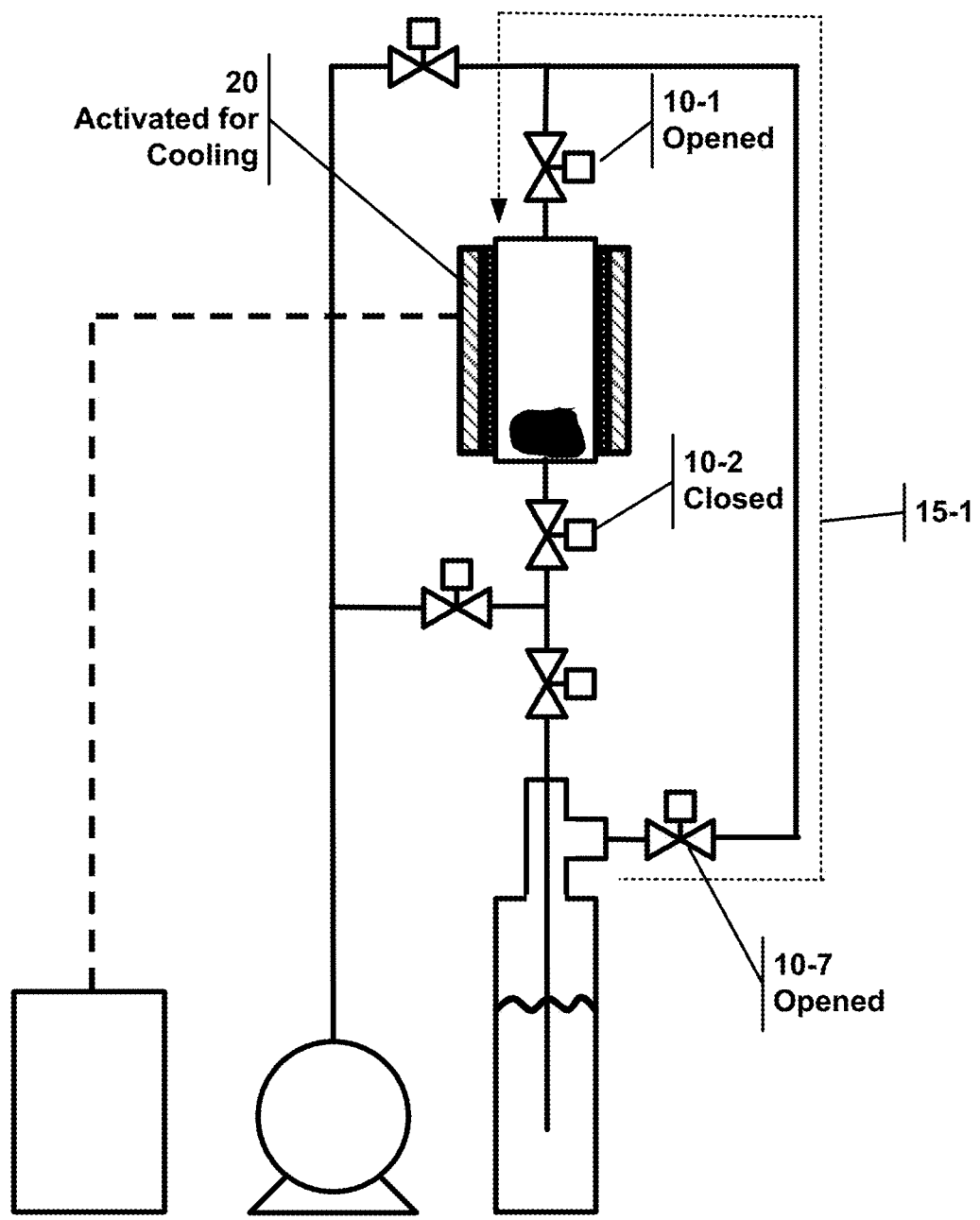
FIG. 3B is the solvent transfer configuration of the setup of FIG. 3A.
Figure 3C:
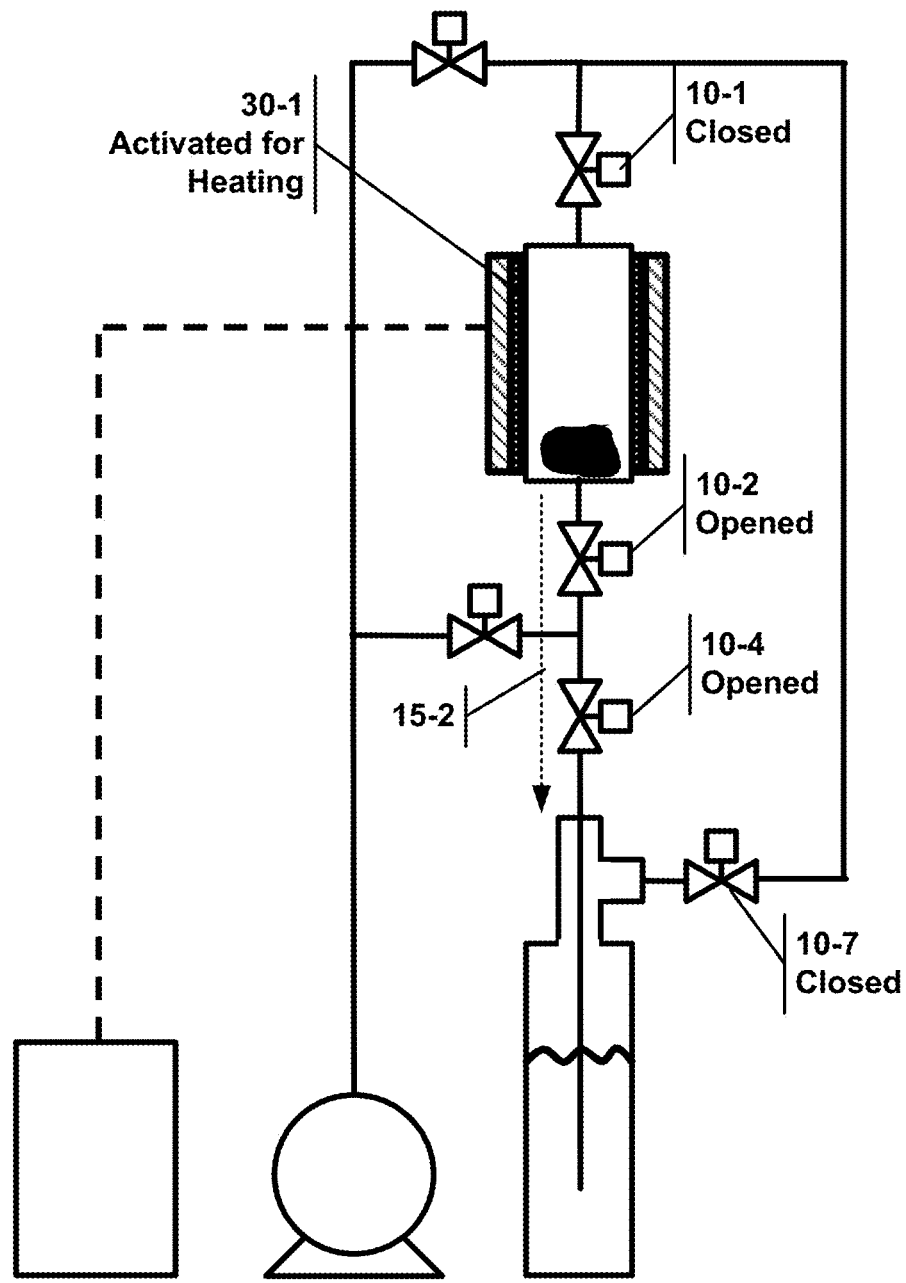
FIG. 3C is the salt transfer configuration of the setup of FIG. 3A.

A second embodiment is illustrated in FIG. 2. In setup 1-2, the solvent container 5-2 is connected to the condensing container 5-1 through valves 10-3 and 10-1. The condensing container 5-1 is connected to the electrolyte container 5-3 through valves 10-2 and 10-4. A vacuum pump 50 is connected between valves 10-3 and 10-1 through a valve 10-5. The vacuum pump 50 is also connected between valves 10-2 and 10-4 through another valve 10-6, and is used to minimize contamination from ambient air during the process of transferring the liquefied gas solvent 15 between the solvent container 5-2 and the condensing container 5-1, and during the transfer of the salt 35 and liquefied gas solvent 15 between the condensing container 5-1 and the electrolyte container 5-3. The vacuum pump 50 may be used to evacuate the connections between the solvent container 5-2 and the condensing container 5-1. The vacuum pump 50 may also be used to evacuate the connections between the condensing container 5-1 and the electrolyte container 5-3 before any transfer occurs between the containers.

In the third through eighth embodiments, shown in FIGS. 3A through 8 respectively, the setups do not require a separate solvent container 5-2 and electrolyte container 5-3; rather, those containers are a single solvent/electrolyte combined container 5-4 that is preloaded with the liquefied gas solvent 15, which is connected to a condensing container 5-1. Specifically in the third embodiment illustrated in FIG. 3A, setup 1-3 has the solvent/electrolyte combined container 5-4 connected to an inlet 6 on the condensing container 5-1 via valves 10-7 and 10-1. The solvent/electrolyte combined container 5-4 is also connected to an outlet 7 on the condensing container 5-1 via valves 10-2 and 10-4. It should be noted that valves 10-7 and 10-4 are optional and can be omitted from the setup 1-3. The solvent/electrolyte combined container 5-4 is pre-loaded with the liquified gas solvent 15. The condensing container 5-1 is cooled below the temperature of solvent/electrolyte combined container 5-4 using heat sink 20. Valves 10-7 and 10-1 are opened, and valve 10-2 is closed, to allow the liquefied gas solvent 15 to evaporate from the solvent/electrolyte combined container 5-4 and condense into the condensing container 5-1. This is shown in the solvent transfer configuration in FIG. 3B, which further illustrates the solvent transfer path 15-1. During the salt transfer configuration shown in FIG. 3C, the condensing container 5-1 is heated above the temperature of the solvent/electrolyte combined container 5-4 using a heating element 30-1. Then, the valves 10-2 and 10-4 are opened, and the valves 10-1 and 10-7 are closed, to allow for the transfer of the salt 35 and the liquefied gas solvent 15 into the solvent/electrolyte combined container 5-4 (as shown by path 15-2).

Figure 4:
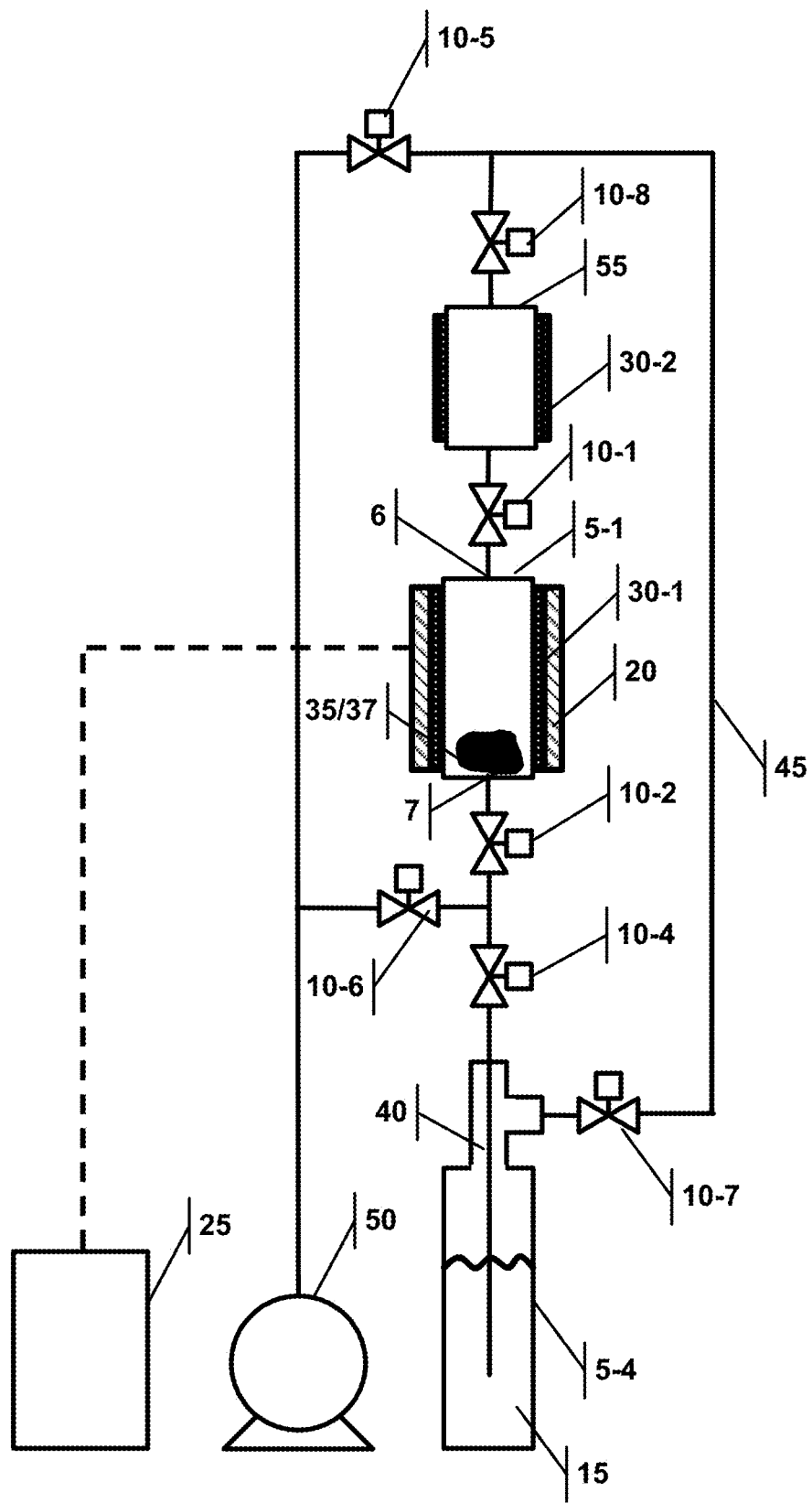
FIG. 4 is a block diagram showing a setup for salt transfer from a condensing container to an electrolyte container using a liquefied gas, which further includes a buffer container.

A fourth embodiment is illustrated in FIG. 4. In setup 1-4, a buffer container 55 connects through the valves 10-8 and 10-7 to the solvent/electrolyte combined container 5-4, and through the valve 10-1 to the condensing container 5-1. The transfer of liquefied gas solvent 15 from the solvent/electrolyte combined container 5-4 to the condensing container 5-1 occurs as described above; however, the valve 10-8 is also open during the transfer to allow the liquefied gas solvent 15 vapor to pass through a buffer container 55 and condense in the condensing container 5-1. During this transfer, the buffer container 55 is heated to a temperature above that of the condensing container 5-1 using a second heating element 30-2. Heating the buffer container 55 above the temperature of the solvent/electrolyte combined container 5-4 may limit the risk of excessive condensation of liquefied gas solvent 15 into the condensing container 5-1.

As the liquefied gas solvent 15 fills the condensing container 5-1, its liquid volume may exceed the volume of the condensing container 5-1. The buffer container 55 may be heated so that the liquefied gas solvent 15 in the condensing container 5-1 reaches a level where the temperature is warmer than that of the solvent/electrolyte combined container 5-4, and the condensation would no longer occur. The buffer container 55 may also be heated during the transfer of the salt 35 and the liquefied gas solvent 14 from the condensing container 5-1 to the solvent/electrolyte combined container 5-4. Heating the condensing container 5-1 after it is full of salt 35 and liquefied gas solvent 15 may cause volumetric expansion of the liquefied gas solvent 15. To accommodate this expansion, the valve 10-8 may be opened to the buffer container 55 so that the liquefied gas solvent 15 can partially fill the buffer container 55. The buffer container 55 may need to be at an equal or higher temperature than that of the condensing container 5-1 while the condensing container 5-1 is heated and the valve 10-8 is open, so that the liquefied gas solvent 15 will not condense from the condensing container 5-1 into the buffer container 55. It should be noted that, while the buffer container 55 is shown in a setup with a solvent/electrolyte combined container 5-4, the buffer container 55 may be used in a setup where there are separate solvent and electrolyte containers, such as disclosed with reference to FIGS. 1A-2.

Figure 5:
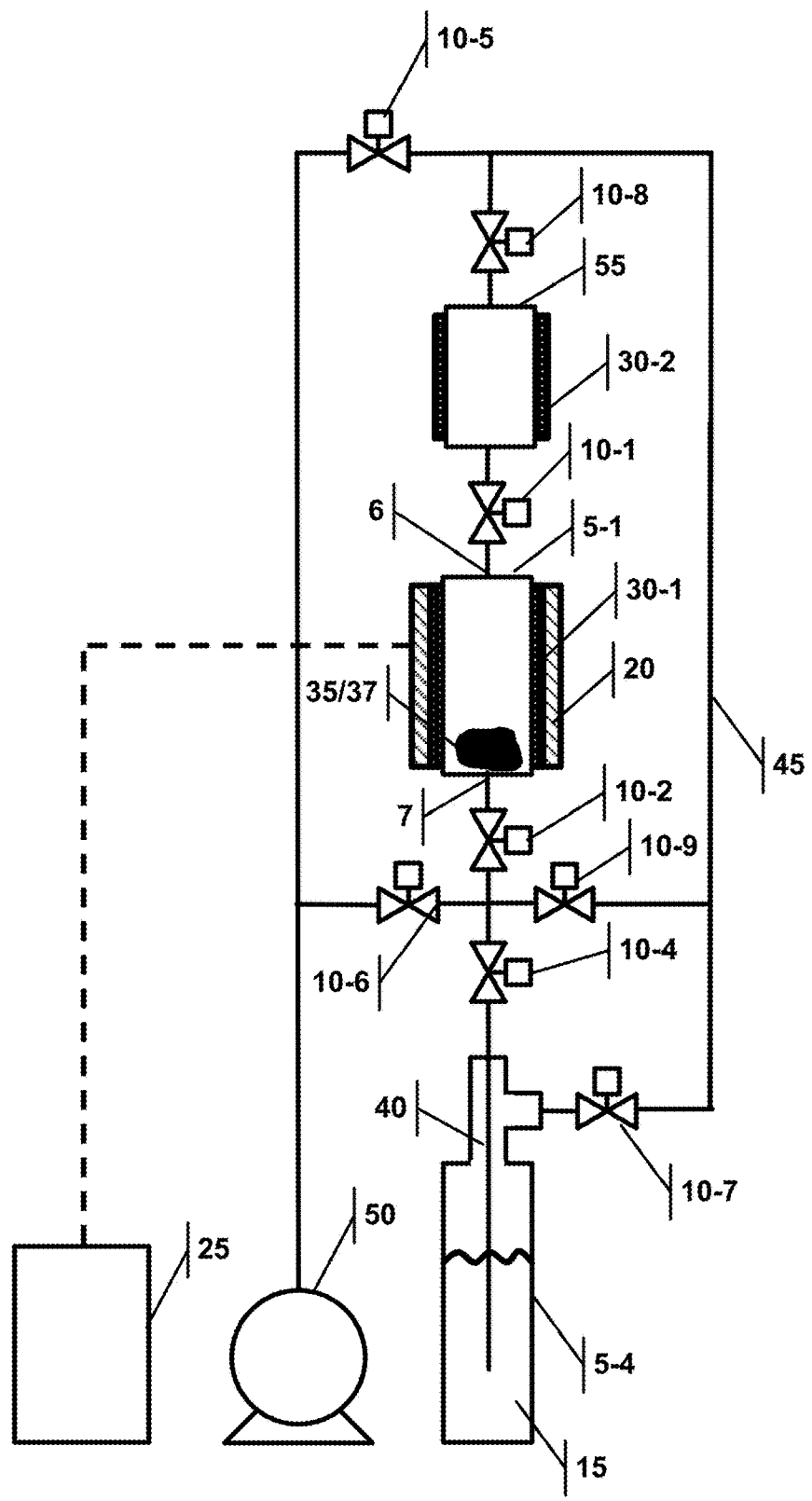
FIG. 5 is a block diagram showing a setup for salt transfer from a condensing container to an electrolyte container using a liquefied gas, which further includes a vapor pre-fill valve.

A fifth embodiment is illustrated in FIG. 5. In setup 1-5, a valve 10-9 is used to directly connect the liquefied gas solvent vapor delivery line from a solvent/electrolyte combined container 5-4 to the connection between valves 10-2 and 10-4. Transferring the salt 35 and the liquefied gas solvent 15 from the condensing container 5-1 to the solvent/electrolyte combined container 5-4 may induce inhomogeneity if the valve 10-2 is opened, and the salt 35 and the liquefied gas solvent 15 flow into an evacuated connection. With the valves 10-2, 10-4 and 10-6 closed, and with the valves 10-7 and 10-9 opened, the liquefied gas solvent 15 vapor from the solvent/electrolyte combined container 5-4 fills the evacuated connection space between valves 10-2, 10-4 and 10-6. Then, the valves 10-7 and 10-9 are closed, and the valves 10-2 and 10-4 are opened to allow the salt 35 and the liquefied gas solvent 15 in the condensing container 5-1 to flow into a connection that contains the liquefied gas solvent 15 vapor, thus reducing the risk of inducing inhomogeneity.

Figure 6:
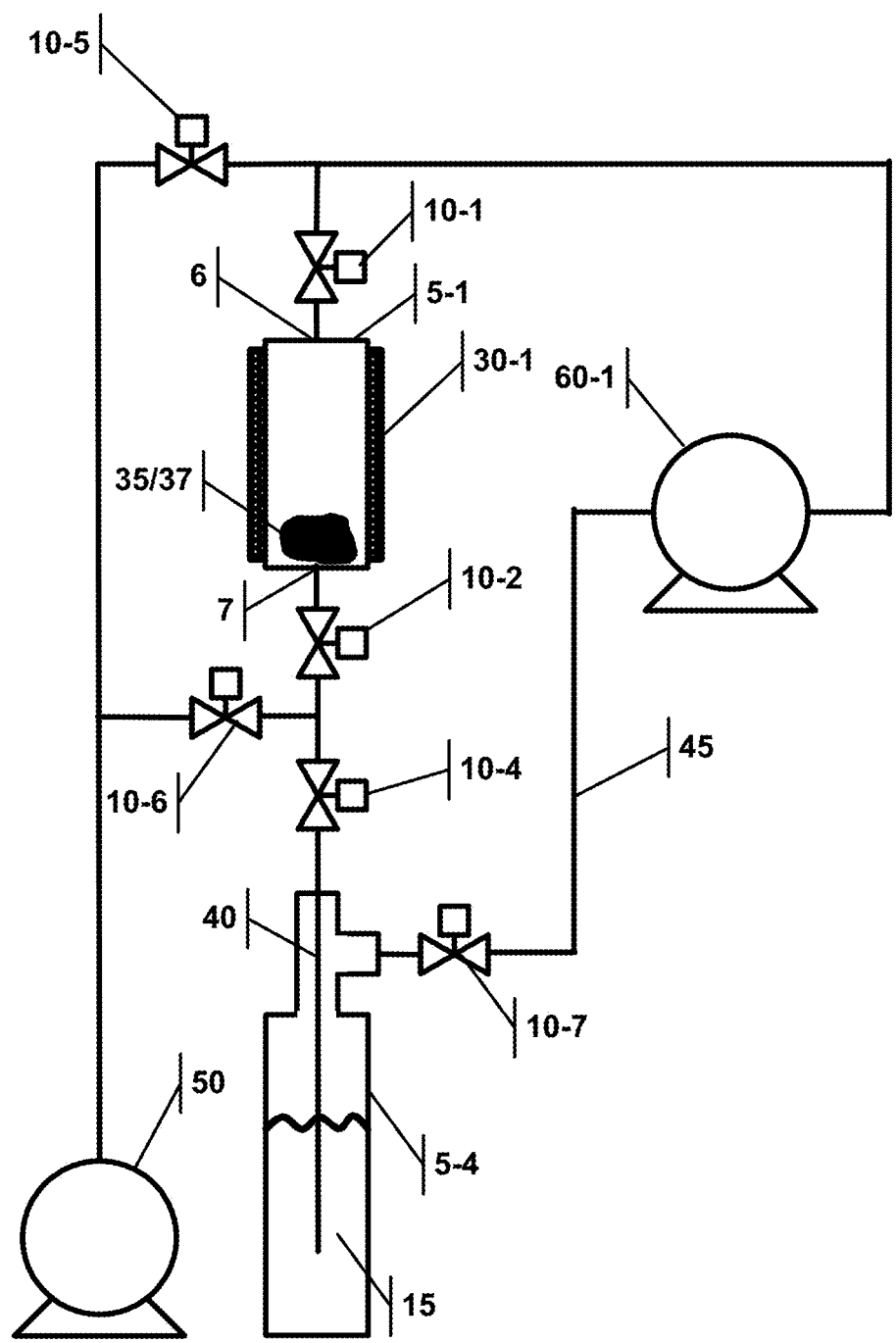
FIG. 6 is a block diagram showing a setup for salt transfer from a condensing container to an electrolyte container using a liquefied gas, which further includes a pump to transfer liquefied gas to the condensing container.

A sixth embodiment is illustrated in FIG. 6. In setup 1-6, the liquefied gas solvent 15 vapor from a solvent/electrolyte combined container 5-4 is pumped into a condensing container 5-1 through a pump 60-1. The use of a pump 60-1 in place of a heat sink 20 on the condensing container 5-1 is because the pump 60-1 can pressurize the liquefied gas solvent 15 vapor and condense it into the condensing container 5-1. The pump 60-1 may provide a faster transfer method. It should be noted that, while the pump 60-1 is shown in a setup with a solvent/electrolyte combined container 5-4, the pump 60-1 may be used in a setup where there are separate solvent and electrolyte containers, such as disclosed with reference to FIGS. 1A-2.

Figure 7:
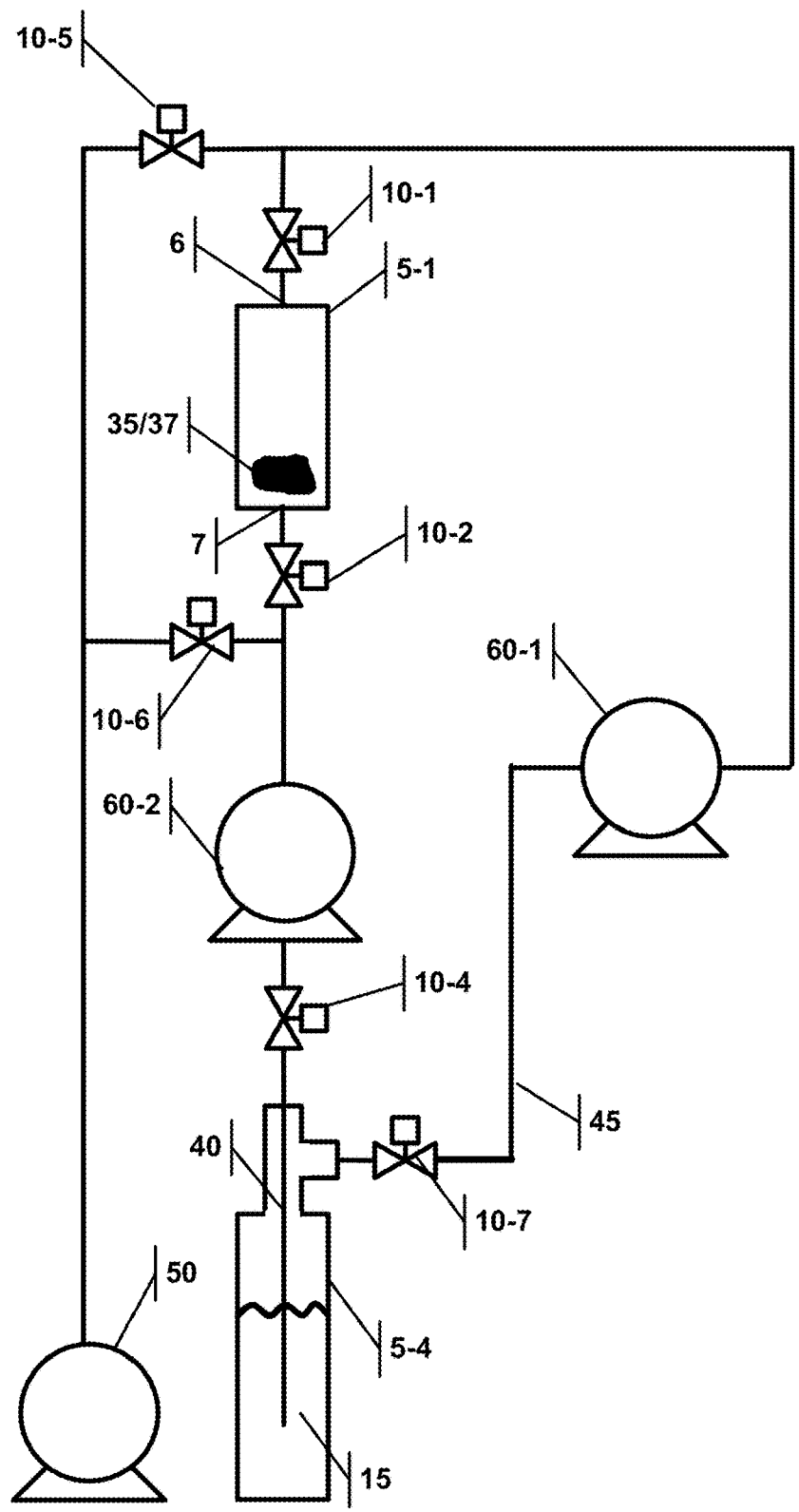
FIG. 7 is a block diagram showing a setup for salt transfer from a condensing container to an electrolyte container using a liquefied gas, which further includes a pump to transfer salt and liquefied gas to the electrolyte container.

A seventh embodiment is illustrated in FIG. 7. In setup 1-7, a pump 60-2 is included between the valves 10-2 and 10-4 so that the liquefied gas solvent 15 and the salt 35 are pumped from a condensing container 5-1 to a solvent/electrolyte combined container 5-4. The pump 60-2 may provide a faster transfer method. Again, it should be noted that while the pump 60-2 is shown in a setup with a solvent/electrolyte combined container 5-4, the pump 60-2 may be used in a setup where there are separate solvent and electrolyte containers, such as disclosed with reference to FIGS. 1A-2.

Figure 8:
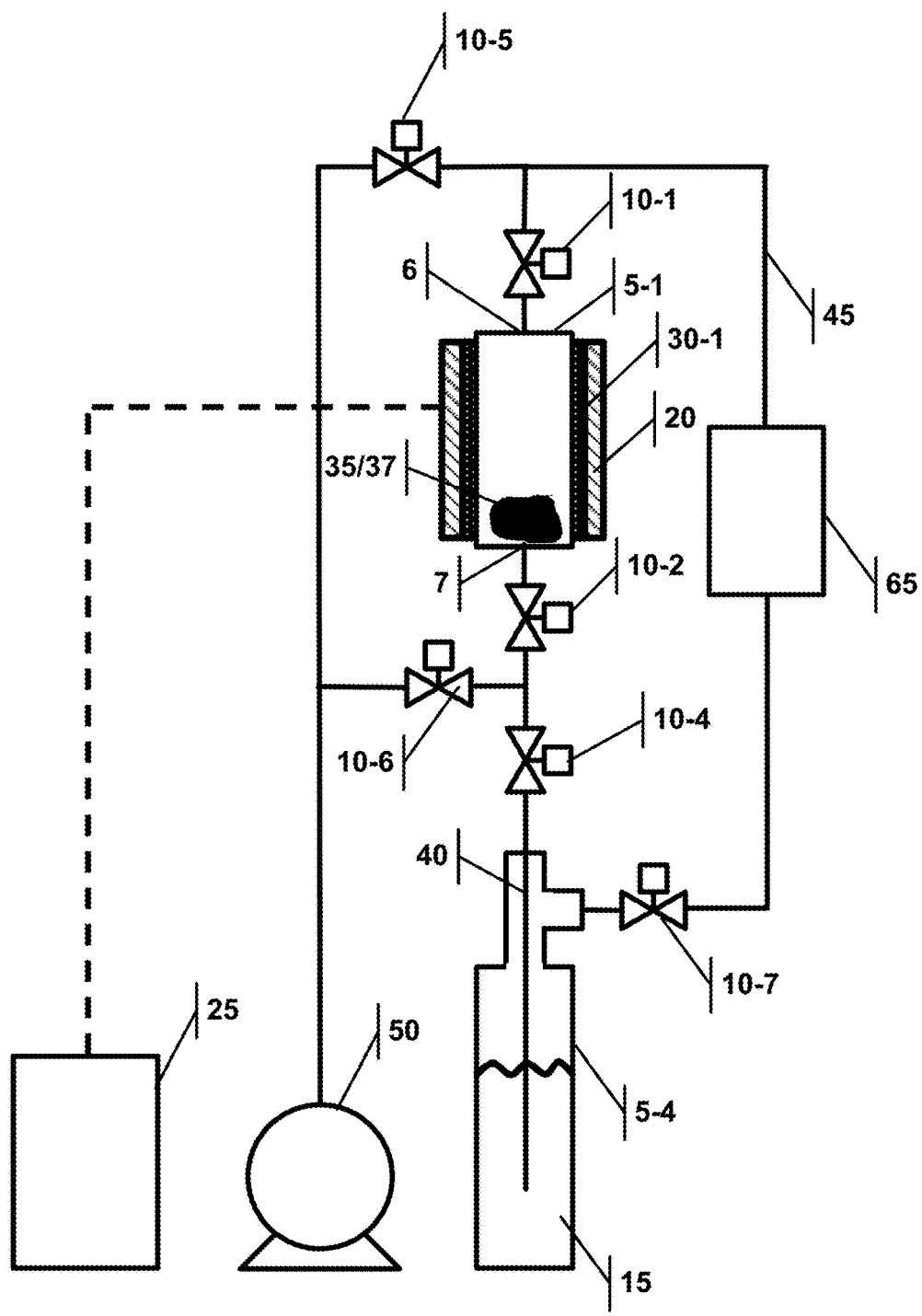
FIG. 8 is a block diagram showing a setup for salt transfer from a condensing container to an electrolyte container using a liquefied gas, which further includes a mass flow controller to transfer liquefied gas to the condensing container.

A final embodiment of this invention is illustrated in FIG. 8. In setup 1-8, a mass flow controller (MFC) 65 is positioned in between the solvent/electrolyte combined container 5-4 and the condensing container 5-1 to control the amount of the liquefied gas solvent 15 vapor that flows into the condensing container 5-1, so that when the condensing container 5-1 is heated, the liquid does not completely fill the internal volume of the condensing container 5-1 and does not risk over-pressurizing the condensing container 5-1. Use of an MFC 65 may simplify the setup by providing control of the fill level of condensing container 5-1 so that a buffer container, such as the buffer container 55 in setup 1-4, may not be necessary. The MFC 65 may include, but is not limited to: thermal type flow controllers or Coriolis type flow controllers. It should be noted that, while the MFC 65 is shown in a setup with a solvent/electrolyte combined container 5-4, the MFC 65 may be used in a setup where there are separate solvent and electrolyte containers, such as disclosed with reference to FIGS. 1A-2.

Although a processor 47 is not shown in setups 10-2 through 10-8, a processor 47 may nevertheless be connected to the valves (10-1, 10-2, 10-3, 10-4, 10-5, 10-6, 10-7, 10-8, 10-9), heating elements (30-1, 30-2), a heat sink 20, pumps (50, 60-1, 60-2) and a MFC 65 to fully or partially automate the solvent transfer and/or salt transfer in those setups.

The salt 35 may include one or more of the following: lithium bis(trifluoromethanesulfonyl)imide (LiTFSI), lithium hexafluorophosphate (LiPF6), lithium perchlorate (LiClO4), lithium hexafluoroarsenate (LiAsF6), lithium tetrachloroaluminate (LiAlCl4), lithium tetragaliumaluminate, lithium bis(oxalato) borate (LiBOB), lithium hexafluorostannate (LiSnF4), lithium difluoro (oxalato) borate (LiDFOB), lithium bis(fluorosulfonyl)imide (LiFSI), lithium aluminum fluoride (LiAlF3), lithium nitrate (LiNO3), lithium trifluoromethanesulfonate, lithium tetrafluoroborate (LiBF4), lithium difluorophosphate, lithium tetrafluoro (oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, dilithium squarate, lithium croconate dihydrate, dilithium rhodizonate, dilithium ketomalonate, lithium diketosuccinate or any corresponding salts with a positively charged sodium or magnesium cation substituted for the lithium cation, or any combinations thereof. Further useful salts include those with positively charged cations such as tetramethylammonium, tetraethylammonium, tetrapropylammonium, tetrabutylammonium, triethylmethylammonium, spiro-(1,1')-bipyrrolidinium, 1,1-dimethylpyrrolidinium, and 1,1-diethylpyrrolidinium, N,N-diethyl-N-methyl-N(2-methoxyethyl) ammonium, N,N-Diethyl-N-methyl-N-propylammonium, N,N-dimethyl-N-ethyl-N-(3-methoxypropyl) ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl) ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalato) borate, bis(trifluoromethanesulfonyl)imide, bromide, chloride, dicyanamide, diethyl phosphate, hexafluorophosphate, hydrogen sulfate, iodide, methanesulfonate, methyl-phophonate, tetrachloroaluminate, tetrafluoroborate, trifluoromethanesulfonate, isomers thereof, or a combination thereof.

The liquefied gas solvent 15 may include one or more of the following: dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, 3,3,3-trifluoropropene, 2,3,3,3-tetrafluoropropene, trans-1,3,3,3-tetrafluoropropene, trans-1,1,1,4,4,4-hexafluoro-2-butene, cis-1,1,1,4,4,4-hexafluoro-2-butene, 1,1-difluoroethene, 1,2-difluoroethene, 1,1-dichloroethene, vinyl chloride, vinyl fluoride, hexafluoropropene, hexafluorobutadiene, trichloroethene, dichloroethene, chlorofluorocthene, (Z)-1-chloro-2,3,3,3,-tetrafluoropropene, trans-1-chloro-3,3,3-trifluoropropene, 3,3,4,4,4-pentafluoro-1-butene, hydrofluoroolefins (HFOs), hydrochloroolefins (HCOs), hydrochlorofluoroolefins (HCFOs), perfluoroolefins (PFOs), or perchloroolefins (PCOs), perfluoroolefins, methane, ethane, propane, n-butane, iso-butane, cyclopropane, cyclopropane, ethene, propene, butene, cyclobutane, cyclobutene, acetylene, pentane, hexane, heptane, octane, cyclopentane, cyclohexane, cycloheptane, cyclooctane, isomers thereof, or a combination thereof.

The additive 37 may include one or more of the following: dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl) carbonate, bis(difluoroethyl) carbonate, bis(trifluoroethyl) carbonate, bis(tetrafluoroethyl) carbonate, bis(pentafluoroethyl) carbonate, bis(hexafluoroethyl) carbonate, vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl)ethylene carbonate, bis(difluoromethyl)ethylene carbonate, bis(trifluoromethyl)ethylene carbonate, methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-Tetrafluoro-3-(1,1,2,2-tetrafluoroethoxy)-propane, trifluoro (trifluoromethoxy) methane, perfluoroethyl ether, fluoromethyl methyl ether, difluoromethyl methyl ether, trifluoromethyl methyl ether, bis(fluoromethyl) ether, bis(difluoromethyl) ether, fluoroethyl methyl ether, difluoroethyl methyl ether, trifluoroethyl methyl ether, bis(fluoroethyl) ether, bis(difluoroethyl) ether, bis(trifluoroethyl) ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluorocthoxyethane, methyl nanofluorobutyl ether, ethyl nanofluorobutyl ether, 2-fluorocthoxymethoxyethane, 2,2-difluoroethoxymethoxyethane, methoxy-2,2,2-trifluoroethoxyethane, ethoxy-2-fluorocthoxymethoxyethane, 2,2-difluoroethoxyethoxyethane, ethoxy-2,2,2-trifluorocthoxyethane, bis(trifluoro)methyl ether, dimethylether, methyl ethyl ether, methyl vinyl ether, perfluoromethyl-vinylether, propylene oxide, tetrahydrofuran, tetrahydropyran, furan, 12-crown-4, 12-crown-5, 18-crown-6, 2-Methyltetrahydrofuran, 1,3-Dioxolane, 1,4-dioxolane, 2-methyloxolane, (1,2-propylene oxide), ethylene oxide, octafluorotetrahydrofuran, acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, trimethylphosphate, triethylphosphate, isomers thereof, and any combination thereof.

The condensing, solvent, electrolyte and buffer containers (5-1, 5-2, 5-3, 55) may be any suitable metal, ceramic, or plastic apparatus capable of holding a liquefied gas electrolyte that has a vapor pressure above an atmospheric pressure of 100 kPa at a temperature of 293.15 K. These containers may be any suitable size for containing the salt 35 and the liquefied gas solvent 15. In some embodiments, the containers may be larger than 1 cubic centimeter, larger than 10 cubic centimeters, larger than 100 cubic centimeters, larger than 1000 cubic centimeters, larger than 10000 cubic centimeters, larger than 100000 cubic centimeters, or larger than 1000000 cubic centimeters. In some embodiments, the containers may vary in capacity from one another.

The heating elements (30-1, 30-2) may be, but are not limited to: heating blankets, heating tape, heating rope, or thermally regulated enclosures.

The valves (10-1, 10-2, 10-3, 10-4, 10-5, 10-6, 10-7, 10-8, 10-9) may include, but are not limited to: ball valves, diaphragm valves, needle valves, and/or butterfly valves.

The pumps (60-1, 60-2) may be any suitable pump including, but are not limited to: a reciprocating piston pump, a centrifugal pump, a turbine pump, and/or a side channel pump.

The various components of the described setups are connected by metal, plastic, or ceramic tubing 45 of various sizes. In some embodiments, for example, the tubing 45 may be, but is not limited to: $1/16$-inch, $1/8$-inch, $1/4$-inch, $1/2$-inch, 1-inch, or 2-inch outer diameter.

While this document contains many specifics, these should not be construed as limitations on the scope of any invention or of what may be claimed, but rather as descriptions of features that may be specific to a particular embodiment of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination.

The invention claimed is:

1. A setup for preparing a liquified gas electrolyte (LGE), comprising:
    a solvent container (5-2) comprising a liquified gas solvent (15);
    a condensing container (5-1) comprising a salt (35), a heat sink (20), and a heating element (30-1), wherein the condensing container (5-1) further comprises an inlet (6) and an outlet (7);
    an electrolyte container (5-3);
    a first valve (10-1) fluidly connecting the solvent container (5-2) to the inlet (6);
    a second valve (10-2) fluidly connecting the electrolyte container (5-3) to the outlet (7); and
    wherein the setup comprises:
        a solvent transfer configuration, wherein the first valve (10-1) is opened, the second valve (10-2) is closed, and the heat sink (20) is activated to lower the internal temperature of the condensing container (5-1) to below that of the internal temperature of the solvent container (5-2), causing the liquified gas solvent (15) to transfer from the solvent container (5-2) to the condensing container (5-1); and
        a salt transfer configuration, wherein the first valve (10-1) is closed, the second valve (10-2) is opened, and the heating element (30-1) is activated to raise the internal temperature of the condensing container (5-1) to a temperature above that of the internal temperature of the electrolyte container (5-3), causing the liquified gas solvent (15) and the salt (35) to transfer from the condensing container (5-1) to the electrolyte container (5-3) and mix therein to form the LGE.

2. The setup of claim 1, wherein the heat sink (20) comprises a refrigeration unit (25).

3. The setup of claim 1, wherein the heat sink (20) and the heating element (30-1) are a single device.

4. The setup of claim 1, further comprising:
    a tubing (45) that fluidly connects the solvent container (5-2) to the inlet (6); and
    a vacuum pump (50) fluidly connected to the tubing (45);
    wherein, prior to the solvent transfer configuration, the vacuum pump (50) is activated to evacuate contaminants within the tubing (45).

5. The setup of claim 4, further comprising a third valve (10-5) between the tubing (45) and the vacuum pump (50).

6. The setup of claim 1, further comprising:
    a tubing (45) that fluidly connects the inlet (6) to the electrolyte container (5-3); and
    a vacuum pump (50) fluidly connected to the tubing (45);
    wherein, prior to the salt transfer configuration, the vacuum pump (50) is activated to evacuate contaminants within the tubing (45).

7. The setup of claim 6, further comprising a third valve (10-6) between the tubing (45) and the vacuum pump (50).

8. The setup of claim 1, wherein the solvent container (5-2) and the electrolyte container (5-3) are a single solvent/electrolyte combined container (5-4).

9. The setup of claim 8, further comprising a buffer container (55) fluidly connected to the inlet (6) and to the solvent/electrolyte combined container (5-4).

10. The setup of claim 9, wherein:
    the buffer container (55) comprises a second heating element 30-2; and
    during the solvent transfer configuration, the second heating element (30-2) is activated to raise the internal temperature of the buffer container (55) to a temperature above that of the internal temperature of the condensing container (5-1).

11. The setup of claim 8, further comprising a pump (60-1) fluidly connected to the inlet (6) and to the solvent/electrolyte combined container (5-4).

12. The setup of claim 11, wherein, during the solvent transfer configuration, the pump (60-1) is activated to pump the liquified gas solvent (15) into the condensing container (5-1).

13. The setup of claim 8, further comprising a pump (60-2) fluidly connected to the outlet (7) and to the solvent/electrolyte combined container (5-4).

14. The setup of claim 13, wherein, during the salt transfer configuration, the second pump (60-2) is activated to pump the liquified gas solvent (15) and salt (35) into the solvent/electrolyte combined container (5-4).

15. The setup of claim 8, further comprising a mass flow controller (MFC) (65) fluidly connected to the inlet (6) and to the solvent/electrolyte combined container (5-4).

16. The setup of claim 15, wherein, during the solvent transfer configuration, the MFC (65) controls the amount of liquified gas solvent (15) transferred into the condensing container (5-1).

17. The setup of claim 1, further comprising a pump (60-1) fluidly connected to the inlet (6) and to the solvent container (5-2).

18. The setup of claim 17, wherein, during the solvent transfer configuration, the pump (60-1) is activated to pump the liquified gas solvent (15) into the condensing container (5-1).

19. The setup of claim 1, further comprising a pump (60-2) fluidly connected to the outlet (7) and to the electrolyte container (5-3).

20. The setup of claim 19, wherein, during the salt transfer configuration, the second pump (60-2) is activated to pump the liquified gas solvent (15) and salt (35) into the electrolyte container (5-3).

21. The setup of claim 1, further comprising a mass flow controller (MFC) (65) fluidly connected to the inlet (6) and to the solvent container (5-2).

22. The setup of claim 21, wherein, during the solvent transfer configuration, the MFC (65) controls the amount of liquified gas solvent (15) transferred into the condensing container (5-1).

23. The setup of claim 1, further comprising a processor (47) connected to and controls the heat sink (20), the heating element (30-1), the first valve (10-1) and the second valve (10-2).

24. The setup of claim 23, wherein:
during the solvent transfer configuration, the processor (47) opens the first valve (10-1), closes the second valve (10-2), and activates the heat sink (20); and
during the salt transfer configuration, the processor (47) closes the first valve (10-1), opens the second valve (10-2), and activates the heating element (30-1).

25. The setup of claim 1, wherein the condensing container (5-1) further comprises an additive (37).

26. The setup of claim 25, wherein the additive (37) comprises one or more of the following: dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl) carbonate, bis(difluoroethyl) carbonate, bis(trifluoroethyl) carbonate, bis(tetrafluoroethyl) carbonate, bis(pentafluoroethyl) carbonate, bis(hexafluoroethyl) carbonate, vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl)ethylene carbonate, bis(difluoromethyl)ethylene carbonate, bis(trifluoromethyl)ethylene carbonate, methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-Tetrafluoro-3-(1,1,2,2-tetrafluoroethoxy)-propane, trifluoro (trifluoromethoxy) methane, perfluoroethyl ether, fluoromethyl methyl ether, difluoromethyl methyl ether, trifluoromethyl methyl ether, bis(fluoromethyl) ether, bis(difluoromethyl) ether, fluoroethyl methyl ether, difluoroethyl methyl ether, trifluoroethyl methyl ether, bis(fluoroethyl) ether, bis(difluoroethyl) ether, bis(trifluoroethyl) ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, methyl nanofluorobutyl ether, ethyl nanofluorobutyl ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, bis(trifluoro)methyl ether, dimethylether, methyl ethyl ether, methyl vinyl ether, perfluoromethyl-vinylether, propylene oxide, tetrahydrofuran, tetrahydropyran, furan, 12-crown-4, 12-crown-5, 18-crown-6, 2-Methyltetrahydrofuran, 1,3-Dioxolane, 1,4-dioxolane, 2-methyloxolane, (1,2-propylene oxide), ethylene oxide, octafluorotetrahydrofuran, acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, trimethylphosphate, triethylphosphate, isomers thereof, and any combination thereof.

* * * * *